US007519500B2

(12) United States Patent
Seibert (10) Patent No.: US 7,519,500 B2
(45) Date of Patent: Apr. 14, 2009

(54) METHOD FOR IMPROVED LOCATION DETERMINATION ACCURACY USING FILTERED AND UNFILTERED RANGING SIGNALS

(75) Inventor: Cristina A. Seibert, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/083,852

(22) Filed: Mar. 17, 2005

(65) Prior Publication Data

US 2006/0212259 A1    Sep. 21, 2006

(51) Int. Cl.
*G06F 15/00* (2006.01)
(52) U.S. Cl. .................................................... 702/150
(58) Field of Classification Search ................. 702/150, 702/152, 153, 189, 190, 90, 94, 95, 69, 74; 455/456.1; 342/357.02, 357.09
See application file for complete search history.

(56) References Cited

U.S. PATENT DOCUMENTS

| | | | | |
|---|---|---|---|---|
| 5,166,694 | A | * | 11/1992 | Russell et al. ................ 342/457 |
| 5,590,043 | A | * | 12/1996 | McBurney .................... 342/457 |
| 5,640,618 | A | * | 6/1997 | Uchiyama .................... 396/122 |
| 5,999,126 | A | | 12/1999 | Ito |
| 2002/0115448 | A1 | | 8/2002 | Amerga et al. |
| 2003/0195008 | A1 | * | 10/2003 | Mohi et al. ................ 455/456.5 |
| 2004/0192330 | A1 | | 9/2004 | Gaal |
| 2004/0198382 | A1 | * | 10/2004 | Wong ........................ 455/456.1 |
| 2005/0170844 | A1 | * | 8/2005 | Barclay et al. ............. 455/456.1 |
| 2005/0255854 | A1 | | 11/2005 | Sillasto et al. |
| 2006/0232467 | A1 | * | 10/2006 | Small ........................ 342/357.09 |

FOREIGN PATENT DOCUMENTS

WO    2005125039 A1    12/2005

OTHER PUBLICATIONS

International Search Report-PCT/US2006/009709, International Search Authority, European Patent Office, Aug. 29, 2006.
International Preliminary Report On Patentability Chapter 1-PCT/US2006/009709, The International Bureau of WIPO, Geneva Switzerland, Sep. 18, 2007.

* cited by examiner

*Primary Examiner*—Bryan Bui
(74) *Attorney, Agent, or Firm*—Richard A. Bachand; Linda G. Gunderson; Thomas R. Rouse (57) ABSTRACT

A method for selecting a location determination solution from a set of possible location determination solutions generated from filtered, unfiltered, and loosely filtered ranging signals. The solution is computed using a first algorithm and filtered ranging signals to obtain a filtered location determination solution. Additional location determination solutions are computed using a second algorithm with unfiltered ranging signals to obtain one or more unfiltered location determination solutions. Further additional location determination solutions may be computed using a third algorithm with loosely filtered ranging signals to obtain one or more loosely filtered location determination solutions. A final location determination solution is chosen from the set of filtered location determination solution, unfiltered location determination solutions, and loosely filtered location determination solutions via an optimizing metric, M.

20 Claims, 10 Drawing Sheets

METHOD FOR IMPROVED LOCATION DETERMINATION ACCURACY USING FILTERED AND UNFILTERED RANGING SIGNALS

FIELD

The field of the present invention relates generally to methods for location determination. More particularly, the present invention relates to a method using various metrics on filtered and unfiltered ranging signals for improving accuracy in location determination systems.

BACKGROUND

In range-based location determination systems, time delay measurements of ranging signals from a plurality of sources are converted to range information associated with the source of each ranging signal. Ranges to different sources with known locations are combined to solve for the unknown user location via geometric techniques known, for example, as trilateration (triangulation). If delay of ranging signals cannot be known reliably (e.g. in asynchronous systems where the user clock is not synchronized to the network), location determination algorithms may treat user clock temporal bias as another unknown, to be solved for by the trilateration process, using an additional ranging measurement.

In location determination systems, measured user distances to a plurality of sources with known locations are combined to solve for the unknown user location via geometric techniques, for example: advanced forward link trilateration (AFLT). AFLT typically requires that the number of measurements available be at least equal to the number of unknown coordinates in the system, including the mobile spatial coordinates and time bias. Typically, multiple ranging signals from a given terrestrial source are available, due to a variety of factors such as antenna sectorization, antenna diversity at the source or receiver (spatial diversity), multiple transmissions of the ranging signal at the source (temporal diversity), and the existence of multi-path. As another example of this technique, multiple ranging signals from orbiting navigation satellites, such as GPS, GLONASS, and Galileo, may be used for location determination of a mobile user.

In prior art location estimation schemes, the ranging signal set is filtered to select a single measurement from each source that is deemed most accurate via a predetermined threshold. In addition, the filtered ranging signal set may be further filtered (i.e., with reduced ranging signal set dimensionality) to exclude single ranging signals from a given source where that single ranging signal is deemed insufficiently accurate or its source is deemed unreliable.

On the one hand, a priori ranging signal filtering can improve statistical confidence in the computed location determination solution due to the exclusion of what is deemed as unreliable ranging signals. However, in some cases, this a priori filtering can lead to accidental exclusion of good ranging signals which may ultimately degrade the accuracy of the location determination solution. In certain scenarios, retention of multiple ranging measurements from each signal source (i.e., using unfiltered ranging signals in the position determination algorithm) may result in improved position determination accuracy Accordingly, it is desirable to provide a method for selecting a location determination solution from a set of possible location determination solutions generated from filtered and unfiltered ranging signals to improve accuracy.

SUMMARY

Disclosed is a method for selecting the optimal, or final, location determination solution from a set of possible location determination solutions from filtered and unfiltered ranging signals. The method includes using a first algorithm and a plurality of filtered ranging signals to compute a filtered location determination solution; using a second algorithm and a plurality of unfiltered ranging signals to compute at least one unfiltered location determination solution; and choosing a final location determination solution from the filtered location determination solution and the unfiltered location determination solution using an optimizing metric. In one embodiment, the metric M is the root mean square (RMS) of residual errors associated with the plurality of filtered ranging signals and the root mean square (RMS) of residual errors associated with the plurality of unfiltered ranging signals. In another embodiment, the metric M is the normalized root mean square (NRMS) of residual errors associated with the plurality of filtered ranging signals and the normalized root mean square (NRMS) of residual errors associated with the plurality of unfiltered ranging signals.

According to another aspect, a method for selecting a location determination solution includes using a first algorithm and a plurality of filtered ranging signals to compute a filtered location determination solution; using a second algorithm and a plurality of unfiltered ranging signals to compute at least one unfiltered location determination solution; using a third algorithm and a plurality of loosely filtered ranging signals to compute at least one loosely filtered location determination solution; and choosing a final location determination solution from the filtered location determination solution, the unfiltered location determination solution and the loosely filtered location determination solution using an optimizing metric.

DETAILED DESCRIPTION

The description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. Specific details may be disclosed to provide a thorough understanding of the invention. However, it will be apparent to those skilled in the art that the invention may be practiced without these specific details. In some instances, well-known structures and devices are shown in block diagram form in order to avoid obscuring the concepts of the invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means.

A method is now disclosed for selecting a location determination solution from a set of possible location determination solutions generated from filtered, unfiltered and loosely filtered ranging signals to improve accuracy. One signal filtering mechanism is as follows. Signals received at a mobile station are considered redundant if they originate at the same signal source, or signal sources that are within some proximity, T, of one another (e.g., 25 meters). Signals are grouped into redundant sets, from which a single signal is selected, based on such factors as the signal phase and the uncertainty associated with that signal phase, computed in some fashion. For example, the phase uncertainty can be derived from the signal power or energy, (e.g. 1/magnitude of the signal power, or some exponent smaller than 1, raised to the signal energy), and some uncertainty associated with the signal transmission at the source, if known or computable. The filtered signals may be chosen to minimize the sum of their phase and phase uncertainty.

Figure 1A:
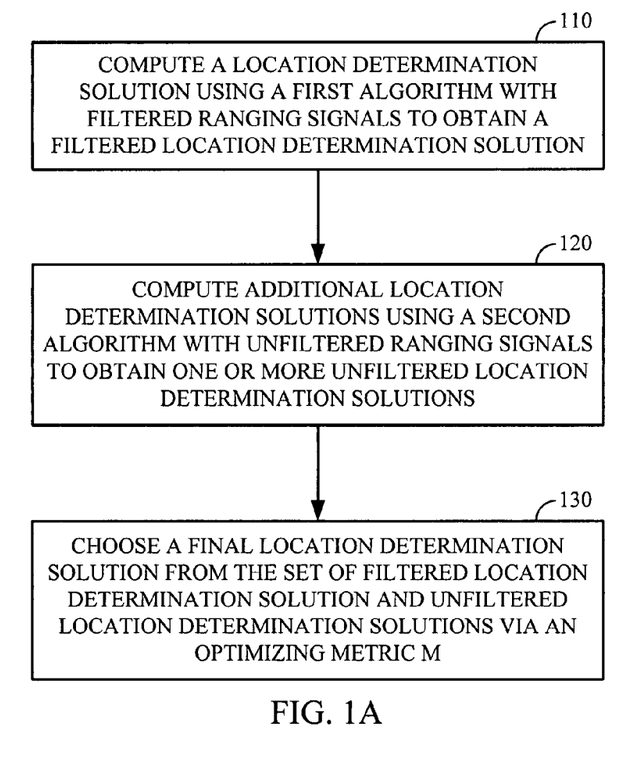
FIG. 1a is a flow diagram of an algorithm for selecting a location determination solution from a set of possible location determination solutions generated from filtered and unfiltered ranging signals to improve accuracy.

FIG. 1a is a flow diagram of an algorithm for selecting a location determination solution from a set of possible location determination solutions generated from filtered and unfiltered ranging signals to improve accuracy. The filtered and unfiltered ranging signals may be transmitted from terrestrial or satellite based sources. In step 110, a location determination solution is computed using a first algorithm with filtered ranging signals to obtain a filtered location determination solution. The first algorithm uses ranging signals that are "filtered" to select a single measurement from each source that is deemed most accurate via a predetermined threshold. The predetermined threshold may be the received ranging signal power. The first algorithm may be any commercially available software, such as the Snaptrack PDM software, available from QUALCOMM Incorporated, or the like.

In step 120, additional location determination solutions are computed using a second algorithm with unfiltered ranging signals to obtain one or more unfiltered location determination solutions. Unfiltered ranging signals include all the ranging signals for each source. The second algorithm may be the same as the first algorithm, an advanced forward link trilateration (AFLT) algorithm, or the like.

In step 130, a final location determination solution is chosen from the set of filtered location determination solutions and the unfiltered location determination solutions via an optimizing metric, M. The metric M may be, for example the root mean square (RMS) of residual errors E across all the ranging signals used in the filtered and unfiltered location determination solutions. Alternatively, the metric, M, may be the normalized root mean square (NRMS) of residual errors E across all the ranging signals used in the filtered and unfiltered location determination solutions. The final location determination solution is the location determination solution with the minimum RMS value or the minimum NRMS. In one definition, NRMS equals RMS divided by the number of used ranging signals. In another definition, NRMS equals RMS divided by the difference of the number of used ranging signals and the number of unknowns (e.g., latitude, longitude, height and clock bias). One skilled in the art would know that other definitions of NRMS may be used.

Figure 1B:
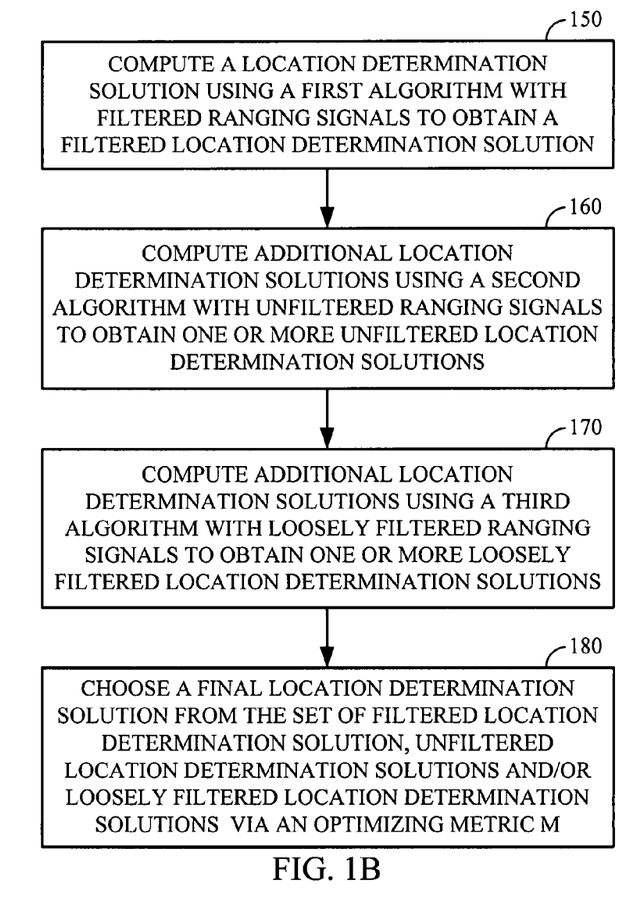
FIG. 1b is a flow diagram of an algorithm for selecting a location determination solution from a set of possible location determination solutions generated from filtered, unfiltered and loosely filtered ranging signals to improve accuracy.

FIG. 1b is a flow diagram of an algorithm for selecting a location determination solution from a set of possible location determination solutions generated from filtered, unfiltered and loosely filtered ranging signals to improve accuracy. The filtered, unfiltered and loosely filtered ranging signals may be transmitted from terrestrial or satellite based sources. In step 150, a location determination solution is computed using a first algorithm with filtered ranging signals to obtain a filtered location determination solution. The first algorithm uses ranging signals that are "filtered" to select a single measurement from each source that is deemed most accurate via a predetermined threshold. The predetermined threshold may be the received ranging signal power. The first algorithm may be any commercially available software, such as the Snaptrack PDM software, or the like.

In step 160, additional location determination solutions are computed using a second algorithm with unfiltered ranging signals to obtain one or more unfiltered location determination solutions. Unfiltered ranging signals include all the ranging signals for each source. The second algorithm may be the same as the first algorithm, may be an advanced forward link trilateration (AFLT) algorithm, or the like.

In step 170, additional location determination solutions are computed using a third algorithm with loosely filtered ranging signals to obtain one or more loosely filtered location determination solutions. Loosely filtered ranging signals are selected from a set of remaining ranging signals (ranging signals that exclude the filtered ranging signals) by using a random Bernoulli distribution with success probability, p, to randomly select the set of loosely filtered ranging signals. One skilled in the art would know the value of p to use for the particular application. The third algorithm may be, for example, the same as the first or second algorithms.

In step 180, a final location determination solution is chosen from the set of filtered location determination solutions, unfiltered location determination solutions and loosely filtered location determination solutions via an optimizing metric, M. The metric M may be the root mean square (RMS) of residual errors E across all the ranging signals used in the filtered and unfiltered location determination solutions. Alternatively, the metric M may be the normalized root mean square (NRMS) of residual errors E across all the ranging signals used in the filtered and unfiltered location determination solutions. The final location determination solution is the location determination solution with the minimum RMS value or the minimum NRMS. In one definition, NRMS equals RMS divided by the number of used ranging signals. In another definition, NRMS equals RMS divided by the difference of the number of used ranging signals and the number of unknowns (e.g., latitude, longitude, height and clock bias). One skilled in the art would know that other definitions of NRMS may be used, as well.

Figure 2:
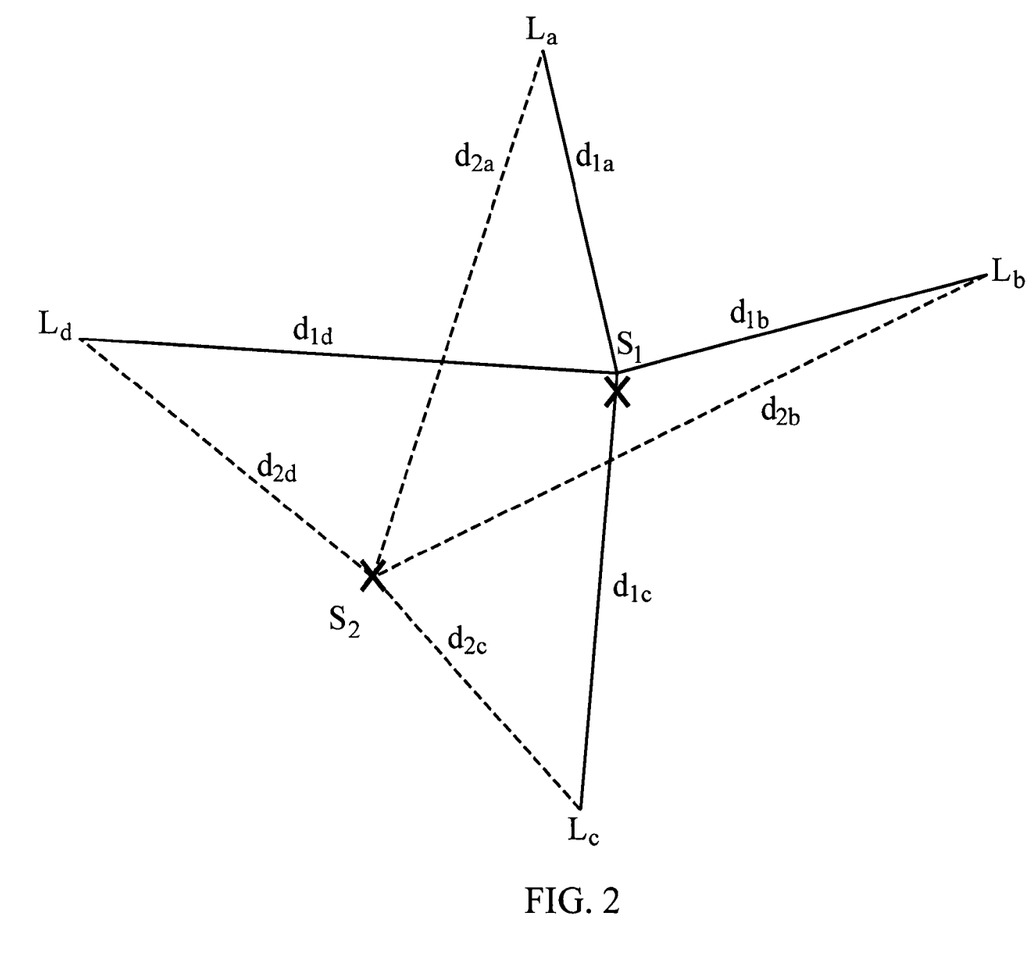
FIG. 2 graphically illustrates the application of the Root Mean Square (RMS) metric for selecting a location determination solution from a set of possible location determination solutions generated from filtered, unfiltered and loosely filtered ranging signals to improve accuracy.
Figure 3:
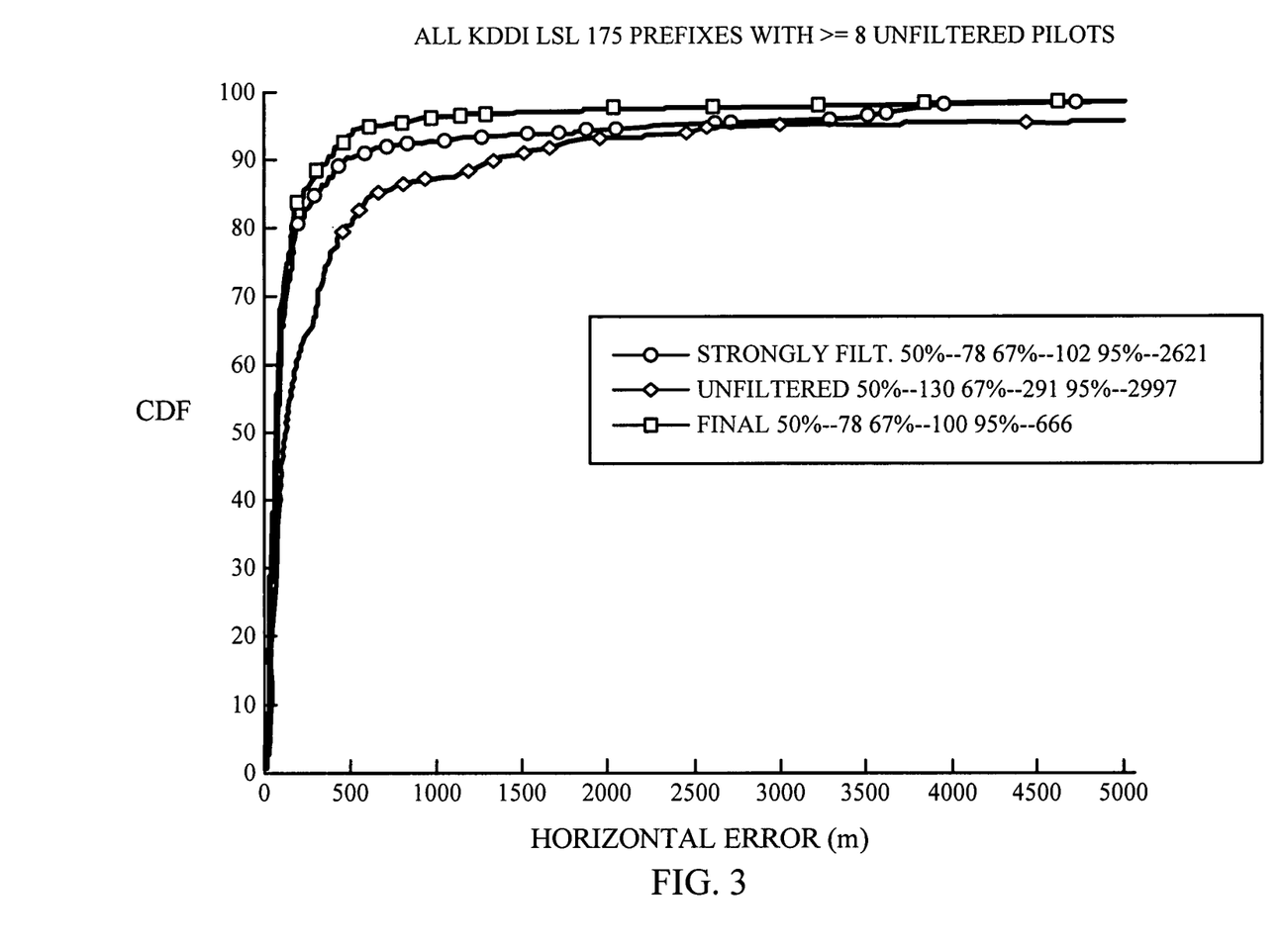
FIG. 3 is a graph of the Cumulative Distribution Function (CDF) of horizontal positioning error for fixes in the LSL 175 dataset.
Figure 4:
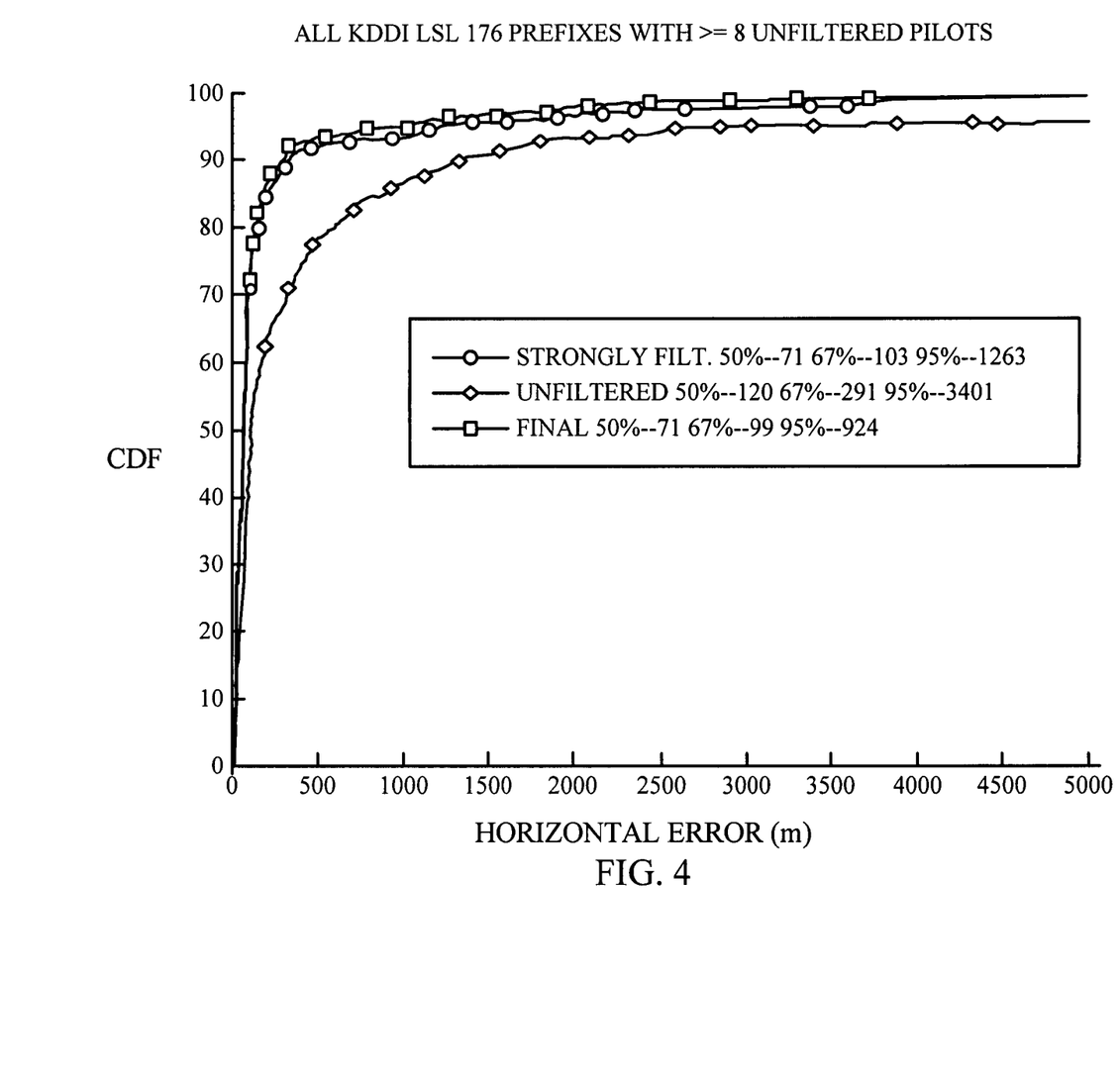
FIG. 4 is a graph of the Cumulative Distribution Function (CDF) of horizontal positioning error for fixes in the LSL 176 dataset.
Figure 5:
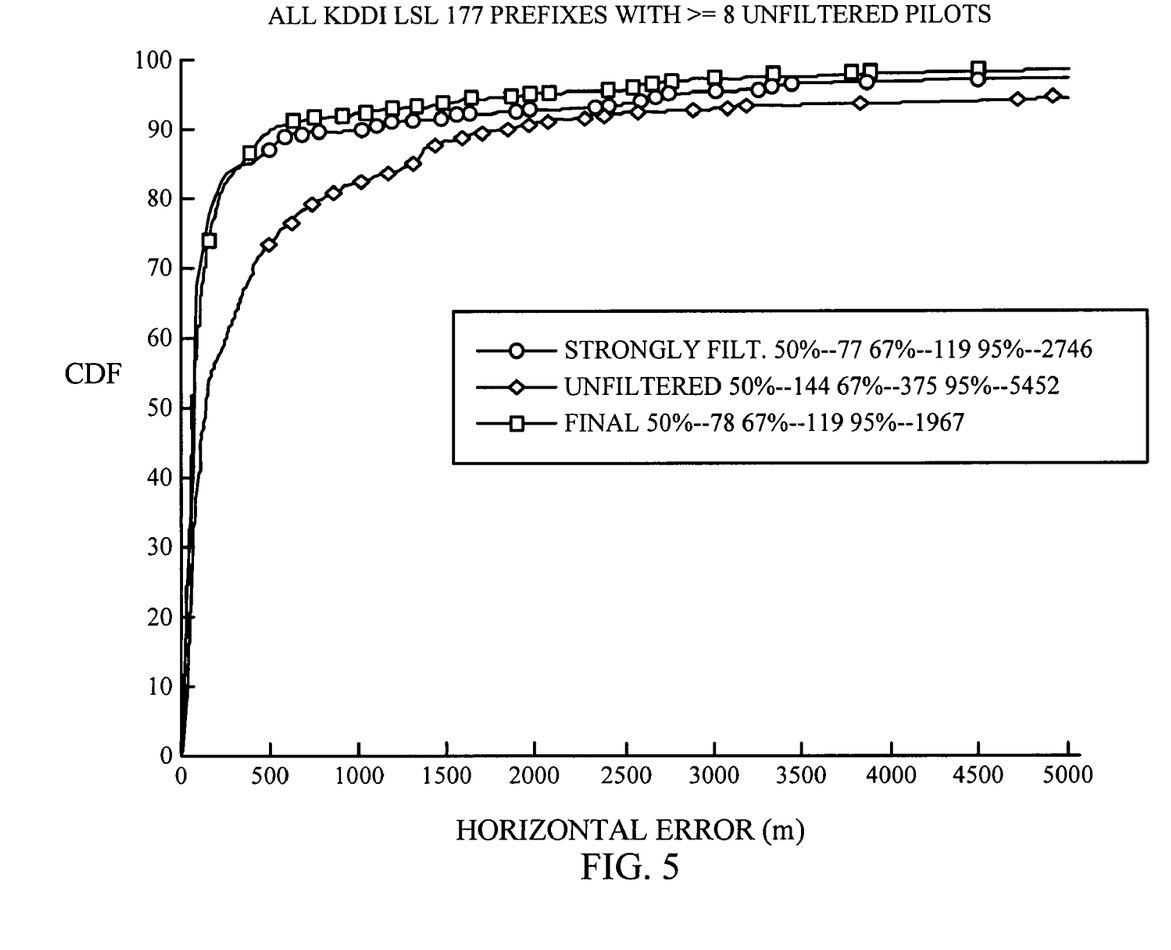
FIG. 5 is a graph of the Cumulative Distribution Function (CDF) of horizontal positioning error for fixes in the LSL 177 dataset.
Figure 6:
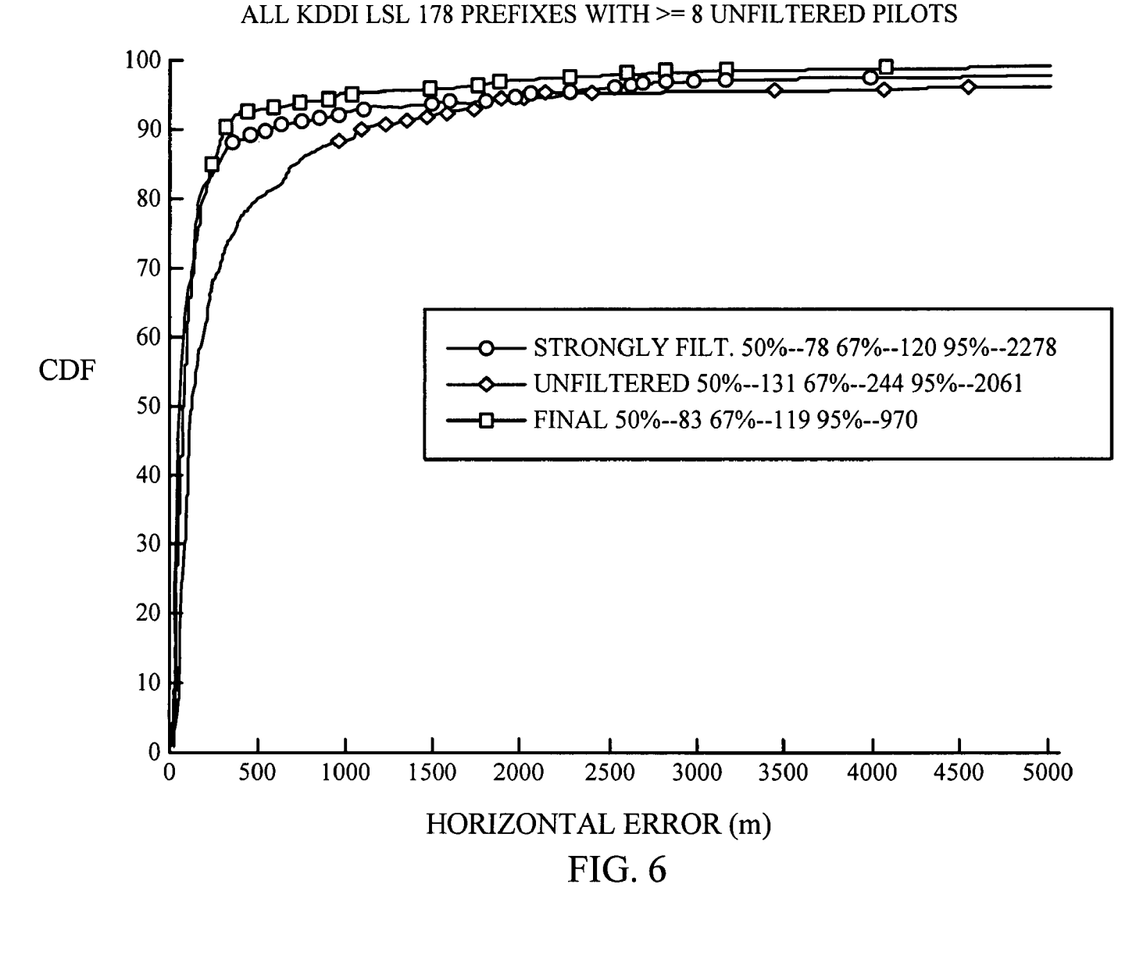
FIG. 6 is a graph of the Cumulative Distribution Function (CDF) of horizontal positioning error for fixes in the LSL 178 dataset.
Figure 7:
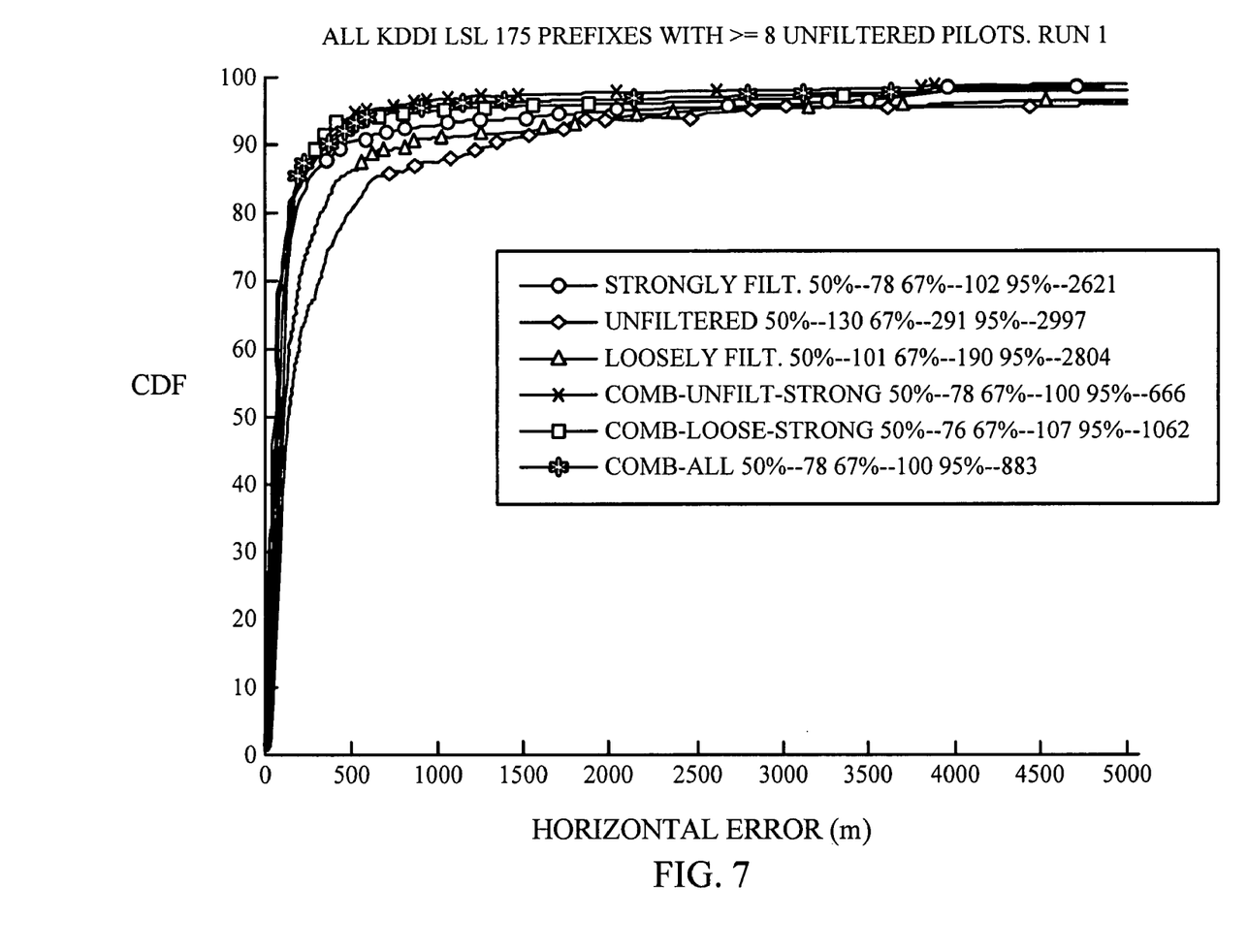
FIG. 7 is a graph of the Cumulative Distribution Function (CDF) of horizontal positioning error for fixes in the LSL 175 dataset with results for filtered, unfiltered, loosely filtered ranging signals and combination thereof.
Figure 8:
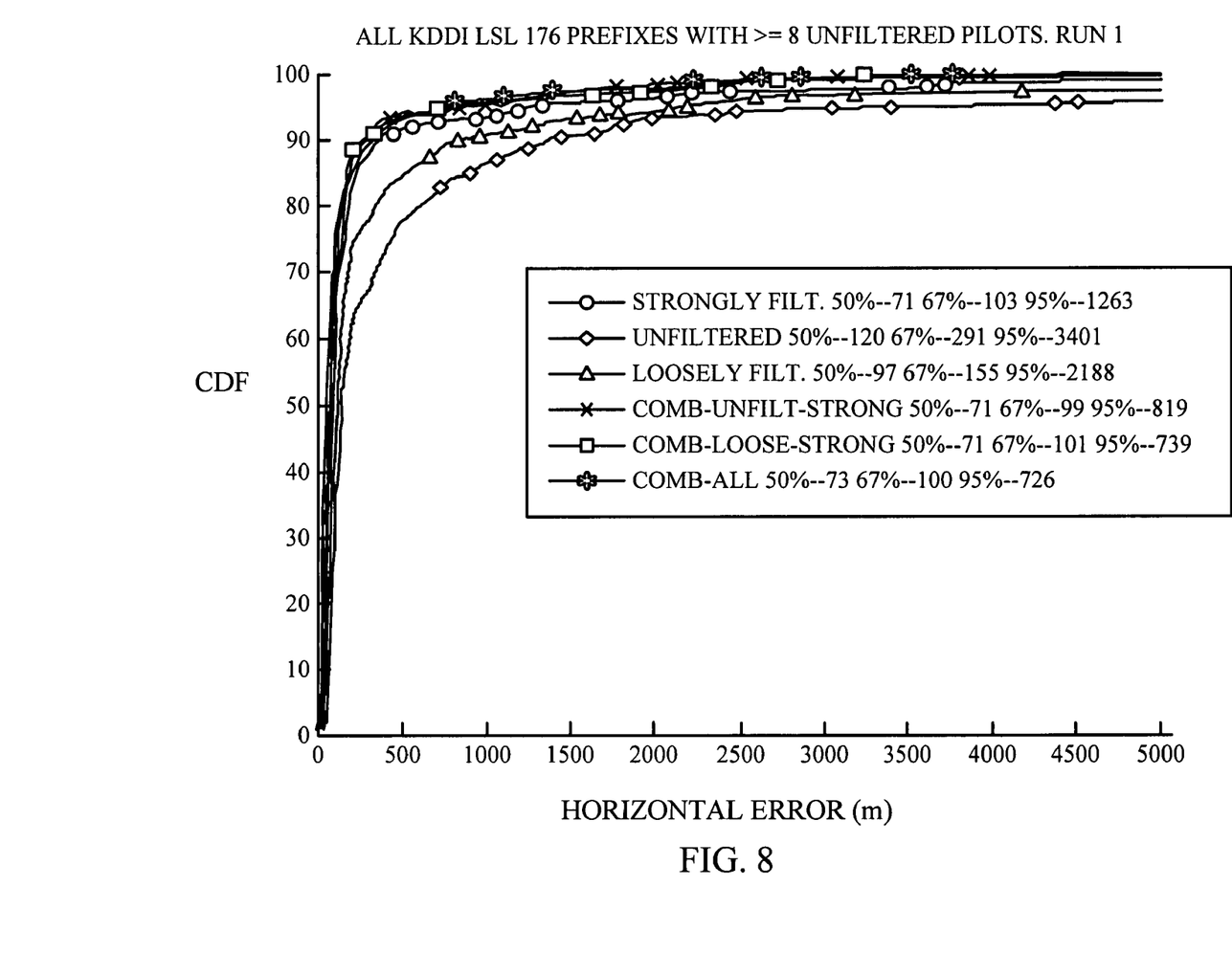
FIG. 8 is a graph of the Cumulative Distribution Function (CDF) of horizontal positioning error for fixes in the LSL 176 dataset with results for filtered, unfiltered, loosely filtered ranging signals and combination thereof.
Figure 9:
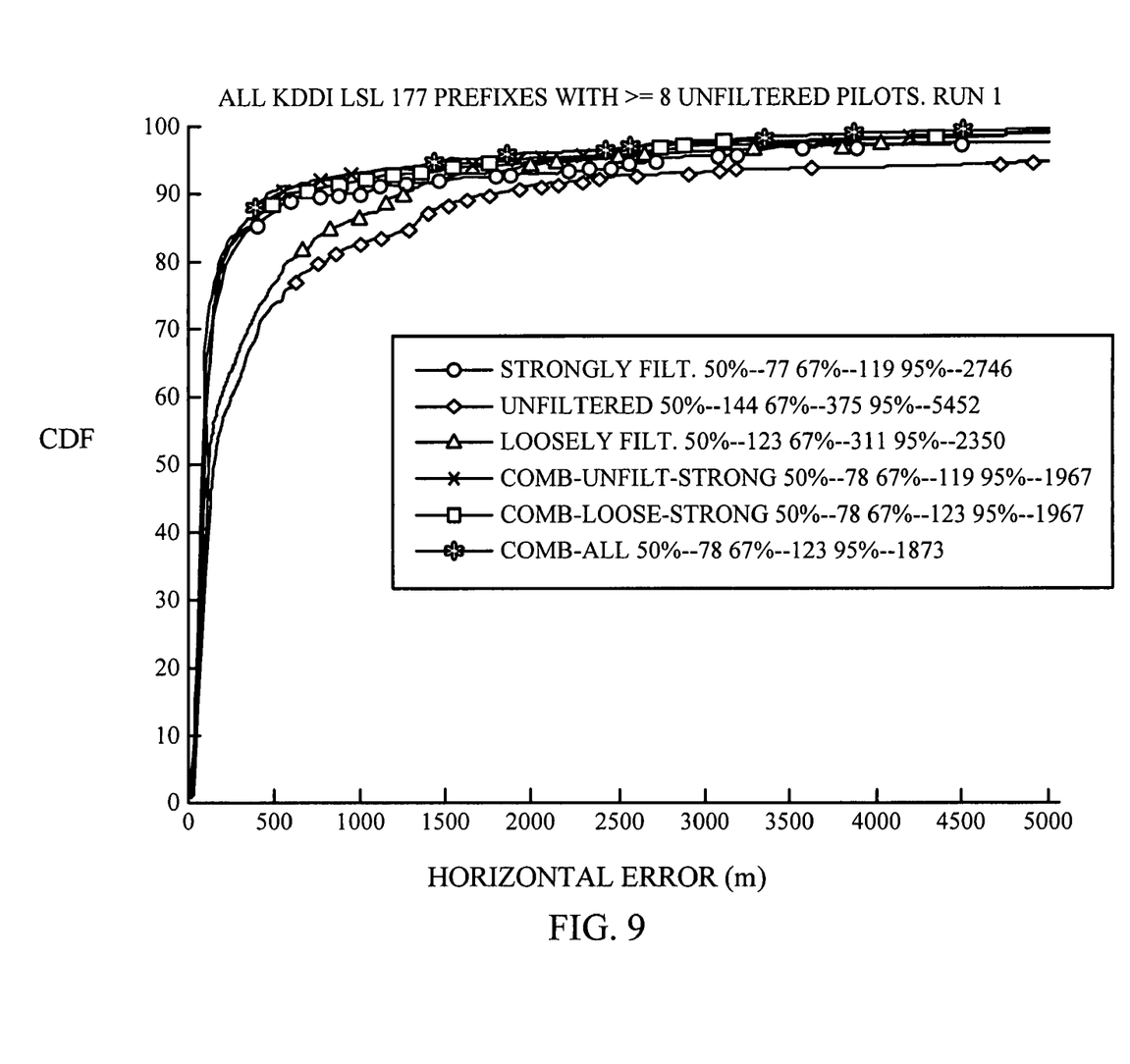
FIG. 9 is a graph of the Cumulative Distribution Function (CDF) of horizontal positioning error for fixes in the LSL 177 dataset with results for filtered, unfiltered, loosely filtered ranging signals and combination thereof.
Figure 10:
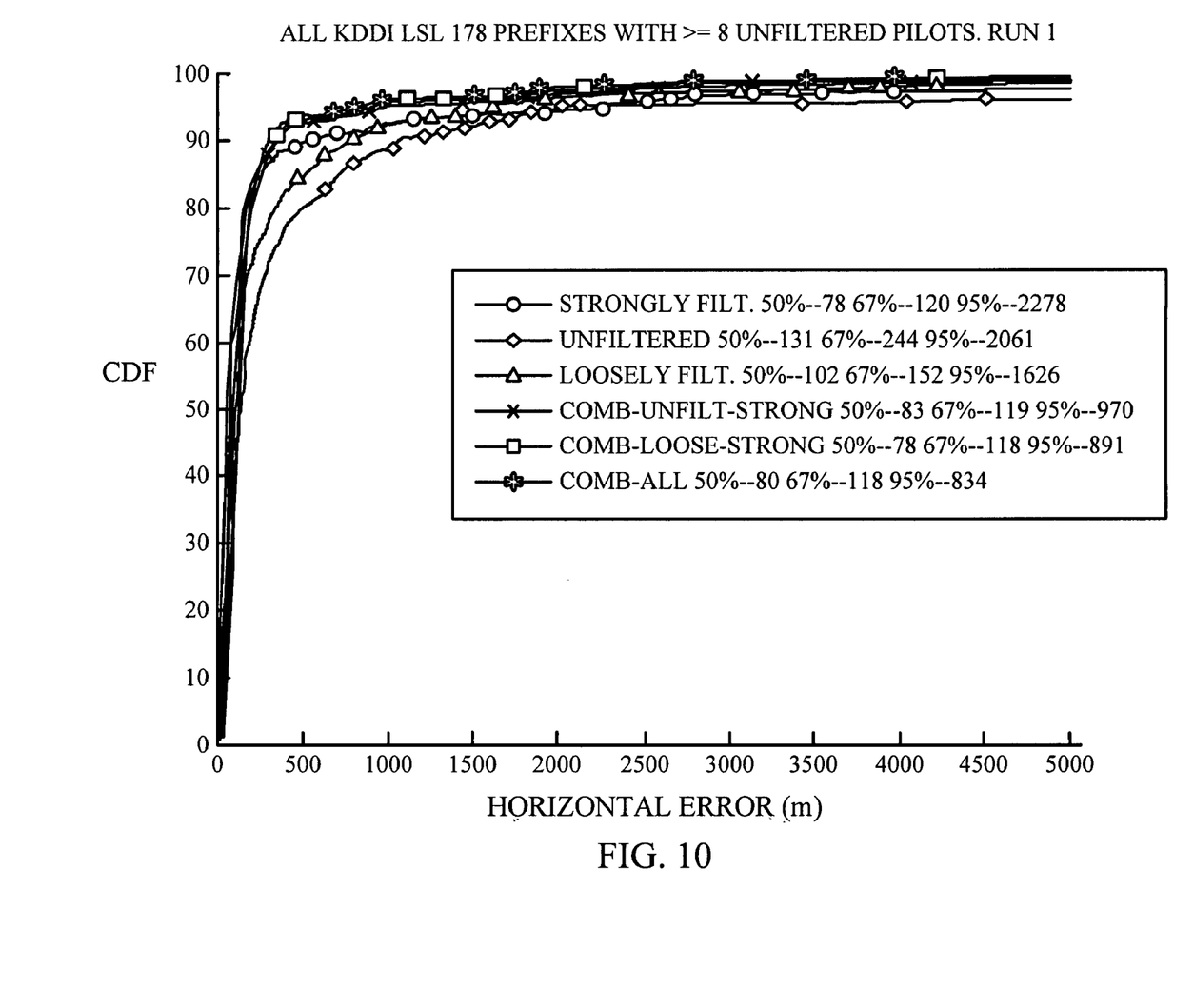
FIG. 10 is a graph of the Cumulative Distribution Function (CDF) of horizontal positioning error for fixes in the LSL 178 dataset with results for filtered, unfiltered, loosely filtered ranging signals and combination thereof.

FIG. 2 graphically illustrates the application of the Root Mean Square (RMS) metric for selecting a location determination solution from a set of possible location determination solutions generated from filtered and unfiltered ranging signals to improve accuracy. Residual error E of a ranging signal is given by the difference between a) the Euclidean distance d between the location L of the ranging signal source and the computed user location S, and b) the pilot phase P (converted to distance units) of that ranging signal, adjusted by the computed clock bias and other common errors.

In the example illustrated in FIG. 2, there are N ranging signal sources (where N=4) at locations $L_a$, $L_b$, $L_c$ and $L_d$. Assume that there are two possible computed user locations $S_1$ and $S_2$. Define Euclidean distances between each of the 4 ranging signal sources at locations $L_a$, $L_b$, $L_c$, and $L_d$ and the first computed user location $S_1$ as:

$d_{1a}=|S_1-L_a|$
$d_{1b}=|S_1-L_b|$
$d_{1c}=|S_1-L_c|$
$d_{1d}=|S_1-L_d|$

Define Euclidean distances between each of the 4 ranging signal sources at locations $L_a$, $L_b$, $L_c$ and $L_d$ and the second computed user location $S_2$ as:

$d_{2a}=|S_2-L_a|$
$d_{2b}=|S_2-L_b|$
$d_{2c}=|S_2-L_c|$
$d_{2d}=|S_2-L_d|$

There are 4 pilot phases $P_{1a}$, $P_{1b}$, $P_{1c}$ and $P_{1d}$ (converted to distance units) associated with the first computed location S1 and the 4 ranging signal sources at locations $L_a$, $L_b$, $L_c$ and $L_d$. The 4 raw residual errors ($E'_{1a}$, $E'_{1b}$, $E'_{1c}$, $E'_{1d}$) associated with the 4 ranging signal sources at locations $L_a$, $L_b$, $L_c$ and $L_d$ and the first computed user location $S_1$ are defined as:

$E'_{1a}=d_{1a}-P_{1a}$
$E'_{1b}=d_{1b}-P_{1b}$
$E'_{1c}=d_{1c}-P_{1c}$
$E'_{1d}=d_{1d}-P_{1d}$

The 4 residual errors ($E_{1a}$, $E_{1b}$, $E_{1c}$, $E_{1d}$) are defined as:
$E_{1a}=E'_{1a}-\text{mean}(E'_{1a}, E'_{1b}, E'_{1c}, E'_{1d})$
$E_{1b}=E'_{1b}-\text{mean}(E'_{1a}, E'_{1b}, E'_{1c}, E'_{1d})$
$E_{1c}=E'_{1c}-\text{mean}(E'_{1a}, E'_{1b}, E'_{1c}, E'_{1d})$
$E_{1d}=E'_{1d}-\text{mean}(E'_{1a}, E'_{1b}, E'_{1c}, E'_{1d})$ Similarly, there are 4 pilot phases $P_{2a}$, $P_{2b}$, $P_{2c}$ and $P_{2d}$ (converted to distance units) associated with the second computed location $S_2$ and the 4 ranging signal sources at locations $L_a$, $L_b$, $L_c$ and $L_d$. The 4 raw residual errors associated with the 4 ranging signal sources at locations $L_a$, $L_b$, $L_c$ and $L_d$ and the second computed user location $S_2$ are defined as:

$E'_{2a}=d_{2a}-P_{2a}$
$E'_{2b}=d_{2b}-P_{2b}$
$E'_{2c}=d_{2c}-P_{2c}$
$E'_{2d}=d_{2d}-P_{2d}$

The 4 residual errors ($E_{2a}$, $E_{2b}$, $E_{2c}$, $E_{2d}$) are defined as:
$E_{2a}=E'_{2a}-\text{mean}(E'_{2a}, E'_{2b}, E'_{2c}, E'_{2d})$
$E_{2b}=E'_{2b}-\text{mean}(E'_{2a}, E'_{2b}, E'_{2c}, E'_{2d})$
$E_{2c}=E'_{2c}-\text{mean}(E'_{2a}, E'_{2b}, E'_{2c}, E'_{2d})$
$E_{2d}=E'_{2d}-\text{mean}(E'_{2a}, E'_{2b}, E'_{2c}, E'_{2d})$ The RMS values ($RMS_1$ and $RMS_2$) associated with the residual errors for each of the two location determination solutions in this example are:

$$RMS_1=\sqrt{(E_{1a2}+E_{1b2}+E_{1c2}+E_{1d2})/N}$$

$$RMS_2=\sqrt{(E_{2a2}+E_{2b2}+E_{2c2}+E_{2d2})/N}$$

where N=4 in this example.

The final location determination solution is the location determination solution with the minimum RMS value among $RMS_1$ and $RMS_2$. One skilled in the art would know that each of the computed user locations may leverage different number of ranging signals (i.e., the N value for $RMS_1$ and $RMS_2$ may be different).

For the purpose of illustration only, simulations using real user data from tests by a wireless carrier in Japan are presented. Four datasets consisting of about 1000 fixes each are shown in FIGS. 3, 4, 5 and 6. The horizontal position error of a solution is computed using the distance between that location determination solution and the "true" user location. Since the "true" user location is not available, the "true" user location is estimated using GPS information. The dataset is limited to include only those fixes where the location estimation based on GPS is available and returns a horizontal position error precision estimate of less than 50 meters (known as GPS50 fixes). Next, the GPS50 fixes are correlated with fixes computed using terrestrial-only techniques, namely trilateration and cell ID. In the simulations, only about 1200 total fixes are used, approximately 300 fixes per dataset after limiting the dataset to fixes having horizontal position error precision estimates of less than 50 meters.

The results are shown in FIGS. 3, 4, 5 and 6. The curves titled "strongly filtered" (herein "filtered") correspond to the results given by a commercial location estimation solution (Snaptrack PDM software). The curve titled "unfiltered" corresponds to a Matlab® implementation of the commercial solution without ranging signal filtering (herein "unfiltered"). The curve titled "final" corresponds to the chosen solution, selected to minimize the RMS of the residual errors across the ranging signals used in the location determination solution, normalized by the number of used ranging signals. As shown in FIGS. 3, 4, 5 and 6, the final location determination solutions outperform the filtered location determination solutions by about 50% on average in the 95th percentile.

The results for strongly-filtered, unfiltered and loosely filtered ranging signals and combinations thereof for each of the four datasets (LSL 175-178) investigated are shown in FIGS. 7-10. The leveraging of the loosely filtered ranging signal sets is shown to improve the 95th percentile of horizontal error in all cases, by about 47% on average. A 51% average improvement in the 95th percentile is observed when all ranging signal sets are leveraged.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

What is claimed is:

1. A method for locating a user comprising:
   using a first algorithm and a plurality of filtered ranging signals to compute a filtered location determination solution;
   using a second algorithm and a plurality of unfiltered ranging signals to compute at least one unfiltered location determination solution; and
   producing a final user location from the filtered location determination solution and the at least one unfiltered location determination solution using an optimizing metric.

2. The method of claim 1, wherein the optimizing metric is a root mean square (RMS) of residual errors associated with the plurality of filtered ranging signals and a root mean square (RMS) of residual errors associated with the plurality of unfiltered ranging signals.

3. The method of claim 1, wherein the optimizing metric is a normalized root mean square (NRMS) of residual errors associated with the plurality of filtered ranging signals and a normalized root mean square (NRMS) of residual errors associated with the plurality of unfiltered ranging signals.

4. The method of claim 1, wherein the first algorithm is Snaptrack PDM software.

5. The method of claim 1, wherein the second algorithm is Snaptrack PDM software.

6. The method of claim 1, wherein the second algorithm is an advanced forward link trilateration (AFLT) algorithm.

7. The method of claim 1, wherein the first algorithm is the same as the second algorithm.

8. The method of claim 1, wherein the plurality of filtered ranging signals are transmitted from at least one terrestrial source.

9. The method of claim 1, wherein the plurality of filtered ranging signals are transmitted from at least one satellite based source.

10. The method of claim 1, wherein the plurality of unfiltered ranging signals are transmitted from at least one terrestrial source.

11. The method of claim 1, wherein the plurality of unfiltered ranging signals are transmitted from at least one satellite based source.

12. A method for locating a user comprising:
    using a first algorithm and a plurality of filtered ranging signals to compute a filtered location determination solution;
    using a second algorithm and a plurality of unfiltered ranging signals to compute at least one unfiltered location determination solution;
    using a third algorithm and a plurality of loosely filtered ranging signals to compute at least one loosely filtered location determination solution; and
    producing a final user location from the filtered location determination solution, the at least one unfiltered location determination solution and the at least one loosely filtered location determination solution using an optimizing metric.

13. The method of claim 12, wherein the optimizing metric is a root mean square (RMS) of residual errors associated with the plurality of filtered ranging signals, a root mean square (RMS) of residual errors associated with the plurality of unfiltered ranging signals and a root mean square (RMS) of residual errors associated with the plurality of loosely filtered ranging signals.

14. The method of claim 12, wherein the optimizing metric is a normalized root mean square (NRMS) of residual errors associated with the plurality of filtered ranging signals, a normalized root mean square (NRMS) of residual errors associated with the plurality of unfiltered ranging signals and a normalized root mean square (RMS) of residual errors associated with the plurality of loosely filtered ranging signals.

15. The method of claim 12 where the third algorithm is the same as the first algorithm.

16. The method of claim 12 where the third algorithm is the same as the second algorithm.

17. Computer readable media embodying a program of instructions executable by a computer program to locate a user, the instructions to cause one or more machines to perform operations comprising:
    using a first algorithm and a plurality of filtered ranging signals to compute a filtered location determination solution;
    using a second algorithm and a plurality of unfiltered ranging signals to compute at least one unfiltered location determination solution; and
    producing a final user location from the filtered location determination solution and the at least one unfiltered location determination solution using an optimizing metric.

18. The computer readable media of claim 17, wherein the optimizing metric is a root mean square (RMS) of residual errors associated with the plurality of filtered ranging signals and a root mean square (RMS) of residual errors associated with the plurality of unfiltered ranging signals.

19. The computer readable media of claim 17, wherein the metric optimizing is a normalized root mean square (NRMS) of residual errors associated with the plurality of filtered ranging signals and a normalized root mean square (NRMS) of residual errors associated with the plurality of unfiltered ranging signals.

20. Computer readable media embodying a program of instructions executable by a computer program to perform a method for locating a user, the instructions to cause one or more machines to perform operations comprising:
    using a first algorithm and a plurality of filtered ranging signals to compute a filtered location determination solution;
    using a second algorithm and a plurality of unfiltered ranging signals to compute at least one unfiltered location determination solution;
    using a third algorithm and a plurality of loosely filtered ranging signals to compute at least one loosely filtered location determination solution; and
    producing a final user location from the filtered location determination solution, the at least one unfiltered location determination solution and the at least one loosely filtered location determination solution using an optimizing metric.

* * * * *